US010106712B2

(12) United States Patent
Vontell et al.

(10) Patent No.: US 10,106,712 B2
(45) Date of Patent: Oct. 23, 2018

(54) METHOD FOR ADHERING STRUCTURES USING SILICONE ADHESIVE SYSTEM

(71) Applicant: United Technologies Corporation, Farmington, CT (US)

(72) Inventors: John H. Vontell, Manchester, CT (US); Jesse C. Meyer, Colchester, CT (US); Charles R. Watson, Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/106,044

(22) PCT Filed: Nov. 12, 2014

(86) PCT No.: PCT/US2014/065158
§ 371 (c)(1),
(2) Date: Jun. 17, 2016

(87) PCT Pub. No.: WO2015/094521
PCT Pub. Date: Jun. 25, 2015

(65) Prior Publication Data
US 2016/0319172 A1    Nov. 3, 2016

Related U.S. Application Data

(60) Provisional application No. 61/918,085, filed on Dec. 19, 2013.

(51) Int. Cl.
*C09J 183/04*    (2006.01)
*C09J 5/02*    (2006.01)
*C08G 77/20*    (2006.01)

(52) U.S. Cl.
CPC ............. *C09J 183/04* (2013.01); *C09J 5/02* (2013.01); *C08G 77/20* (2013.01)

(58) Field of Classification Search
CPC ............ C09J 183/04; C09J 5/02; C08G 77/20
See application file for complete search history.

(56) References Cited

U.S. PATENT DOCUMENTS

| 3,178,379 | A |   | 4/1965  | Wicker, Jr. et al. |                       |
|-----------|---|---|---------|---------------------|-----------------------|
| 3,445,420 | A | * | 5/1969  | Kookootsedes        | ........ C08L 83/04   |
|           |   |   |         |                     | 128/DIG. 21           |
| 3,666,614 | A | * | 5/1972  | Snedeker            | ................ B32B 17/10 |
|           |   |   |         |                     | 428/412               |
| 4,328,277 | A | * | 5/1982  | Molari, Jr.         | .......... B32B 17/1055 |
|           |   |   |         |                     | 428/215               |
| 4,714,739 | A |   | 12/1987 | Arkles              |                       |
| 5,346,723 | A |   | 9/1994  | Hoag et al.         |                       |

(Continued)

OTHER PUBLICATIONS

Torr Technologies Inc. Brochure, Torr Vacuum & Pressure Bagging Tools (1999), see page 2.*

(Continued)

*Primary Examiner* — Michael N Orlando
*Assistant Examiner* — Cynthia L Schaller
(74) *Attorney, Agent, or Firm* — Cantor Colburn LLP

(57) ABSTRACT

A method of adhering a first structure to a second structure using a primer, containing a primer fugitive inhibitor, and a film adhesive by removing the primer fugitive inhibitor under vacuum at room temperature conditions.

13 Claims, 1 Drawing Sheet

(56) References Cited

U.S. PATENT DOCUMENTS

| | | | |
|---|---|---|---|
| 5,492,994 A * | 2/1996 | Gentle | C07F 7/0856 |
| | | | 528/15 |
| 5,973,067 A | 10/1999 | Nakamura | |
| 2002/0160582 A1 | 10/2002 | Chen et al. | |
| 2006/0286809 A1 | 12/2006 | Becker et al. | |

OTHER PUBLICATIONS

Notification of Transmittal of the International Search Report of the International Searching Authority, PCT/US2014/065158, dated Jan. 29, 2015. 3 pages.
Notification of Transmittal of the Written Opinion of the International Searching Authority, or the Declaration; PCT/US201/065158; dated Jan. 29, 2015. 6 pages.
European Search Report for European Application No. 14872612.8 dated Jun. 28, 2017, 6 pages.

* cited by examiner

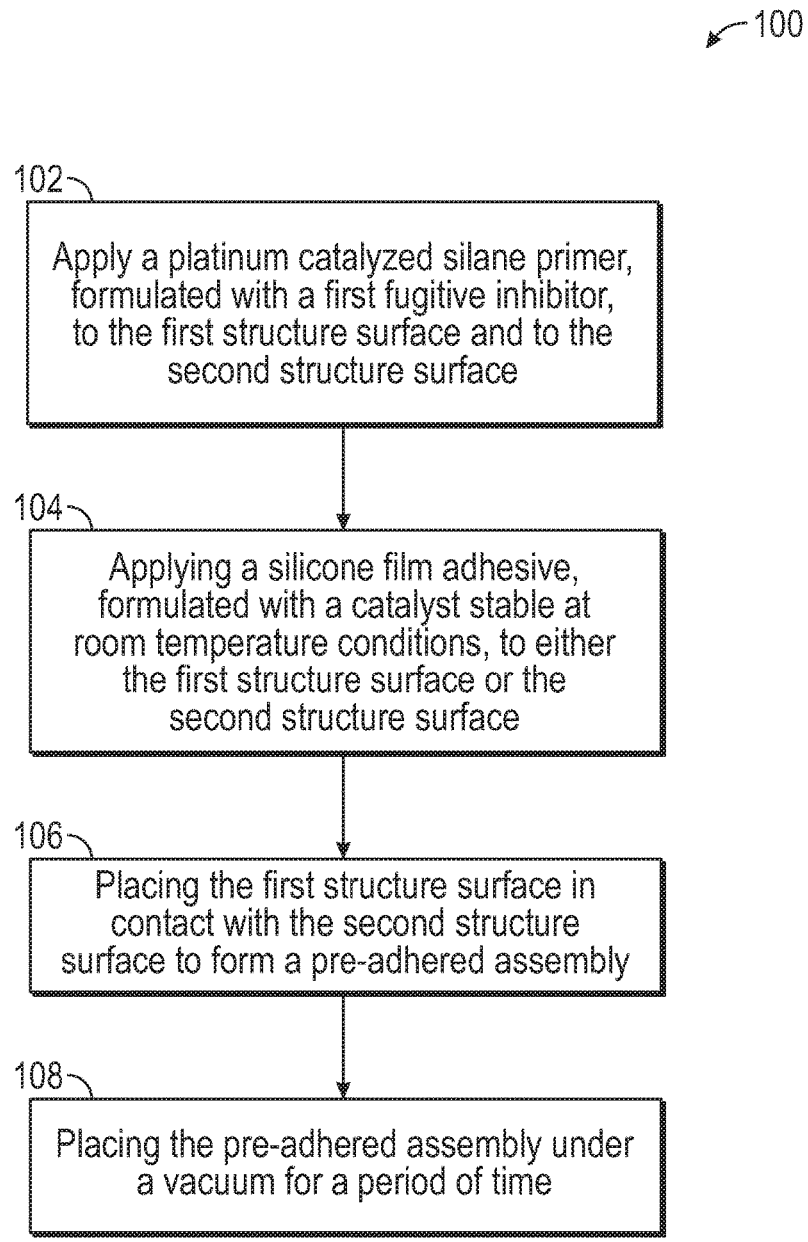

METHOD FOR ADHERING STRUCTURES USING SILICONE ADHESIVE SYSTEM

CROSS REFERENCE TO RELATED APPLICATION

The present application is a National Phase Application of Patent Application PCT/US2014/065158 filed on Nov. 12, 2014, which is related to and claims the priority benefit of U.S. Provisional Patent Application Serial No. 61/918,085, filed Dec. 19, 2013. The contents each of which are hereby incorporated herein by reference in their entirety into this disclosure.

TECHNICAL FIELD OF THE DISCLOSED EMBODIMENTS

The presently disclosed embodiments generally relate to adhesives and, more particularly, to a method for adhering structures using a silicone adhesive system.

BACKGROUND OF THE DISCLOSED EMBODIMENTS

Generally, addition silicones require a primer for adhesion. One such class includes platinum catalyzed silane primers specially formulated for use with platinum catalyzed or peroxide catalyzed adhesive systems where conventional silicone primers may be inefficient. However, the use of platinum-containing primers when paired with platinum or peroxide silicone based adhesives typically requires the compound to be placed in an furnace or autoclave at approximately 300-350 degrees Fahrenheit, for applying increased temperature and increased pressure, to cure the silicone based adhesive. There is therefore a need for an improved method for adhering structures.

BRIEF SUMMARY OF THE DISCLOSED EMBODIMENTS

In one aspect, a method for adhering a first structure to a second structure using a primer, containing a primer fugitive inhibitor, and a film adhesive containing a catalyst is provided. The primer may include a platinum catalyzed silane composition. The film adhesive may include a silicone composition, and the catalyst may be selected from a group consisting of peroxide and platinum, and may include a catalyst fugitive inhibitor.

The method includes the step of applying the primer, formulated with the primer fugitive inhibitor, to the first structure surface and to the second structure surface. The primer is applied on the entire surface of the first structure surface and the entire surface of the second structure surface. The primer may be applied at a thickness of less than or equal to approximately 100 microinches on each surface.

The method includes the step of applying the film adhesive, formulated with the catalyst stable at room temperature conditions, to either the first structure surface or the second structure surface so as to create first and second pre-adhered surfaces. The film adhesive is applied on either the entire surface of the first structure surface or the entire surface of the second structure surface. The film adhesive may be applied at a thickness of less than or equal to approximately 0.02 inch.

The method includes the step of placing the first pre-adhered surface in contact with the second pre-adhered surface to form a pre-adhered assembly. The method includes the step of placing the pre-adhered assembly under a vacuum for a period of time. The period of time includes a sufficient time to remove the primer fugitive inhibitor so as to permit the first and second pre-adhered surfaces to be adhered to one another through the curing of the film adhesive. The period of time also includes a sufficient time to remove the catalyst fugitive inhibitor so as to permit the first and second pre-adhered surfaces to be adhered to one another through the curing of the film adhesive. The period of time may be less than or equal to 8 hours. The first and second pre-adhered surfaces may be placed under pressure. The applied pressure may be less than or equal to approximately 250 pounds per square inch.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 1 is a schematic flow diagram of a method for adhering structures using a silicone adhesive system.

An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a schematic flow diagram of a method 100 for adhering a first structure including a first structure surface to a second structure including at a second structure surface. The method 100 includes the step 102 of applying a primer, formulated with a primer fugitive inhibitor, to the first structure surface and to the second structure surface. In one embodiment, the primer includes a platinum catalyzed silane composition. In one embodiment, the primer is applied on the entire surface of the first structure surface and the entire surface of the second structure surface. In one embodiment, the primer is applied at a thickness of less than or equal to approximately 100 microinches on each surface. For example, it may be desired to adhere structures of a gas turbine engine (e.g. fan, or various erosion coating components found in a compressor section, etc.) using platinum or peroxide cured silicone. To enable the silicone to bond to the first structure surface and the second structure surface, a platinum catalyzed silane primer is applied to the structures to be adhered.

The method includes step 104 of applying a film adhesive, formulated with a catalyst stable at room temperature conditions, to either the first structure surface or the second structure surface so as to create first and second pre-adhered surfaces. In one embodiment, the film adhesive includes a silicone composition. In one embodiment, the catalyst is selected from a group consisting of peroxide and platinum. In one embodiment, the catalyst includes a catalyst fugitive inhibitor. In one embodiment, the film adhesive is applied on either the entire surface of the first structure surface or the entire surface of the second structure surface. In one embodiment, the film adhesive is applied at a thickness of less than or equal to approximately 0.02 inch. For example, as the silicone film adhesive is applied, no chemical reaction takes place between the silicone based adhesive film and the platinum based catalyst primer, as the primer and/or catalyst fugitive inhibitors makes the compound stable at room temperature.

The method includes step 106 of placing the first pre-adhered surface in contact with the second pre-adhered surface to form a pre-adhered assembly. The method then proceeds to step 108 of placing the pre-adhered assembly under a vacuum for a period of time. For example, the pre-adhered assembly may be placed in a vacuum bag on a plate, wherein the vacuum is attached to the vacuum bag. In one embodiment, the period of time includes a sufficient time to remove the primer fugitive inhibitor so as to permit the first and second pre-adhered surfaces to be adhered to one another through the curing of the silicone film adhesive. In one embodiment, the period of time includes a sufficient time to remove the catalyst fugitive inhibitor so as to permit the first and second pre-adhered surfaces to be adhered to one another through the curing of the silicone film adhesive. In one embodiment, the period of time is less than or equal to 8 hours. In one embodiment, the first and second pre-adhered surfaces are placed under pressure. In one embodiment the applied pressure is less than or equal to approximately 250 pounds per square inch. For example, as the pre-adhered assembly is placed under the vacuum, and optionally under pressure, the vacuum and removes the primer fugitive inhibitor from the platinum catalyzed silane primer, and the catalyst fugitive inhibitor from the silicone film adhesive; thus, allowing the platinum catalyst to produce a chemical reaction to cure the silicone film adhesive. It will be appreciated that the silicone film adhesive may be cured at room temperature; thus, eliminating the need to place the pre-adhered assembly under additional heat from an autoclave, for example. The ability to eliminate the requirement of additional heat also aids in the protection of other parts of the structures which may use epoxy or urethane, as these compounds may be more susceptible to the additional heat.

It will be appreciated from the present disclosure that the embodiments disclosed herein provide for a method of adhering a first structure to a second structure using a primer and a film adhesive in room temperature condition by removing a primer fugitive inhibitor formulated with the primer under vacuum.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of adhering a first structure including a first surface to a second structure including a second surface, the method comprising the steps of:
   (a) applying a primer, formulated with a primer fugitive inhibitor, to the first surface and to the second surface;
   (b) applying a film adhesive, formulated with a catalyst stable at room temperature conditions, to one of the first surface and the second surface so as to create first and second pre-adhered surfaces;
   (c) placing the first pre-adhered surface into contact with the second pre-adhered surface to form a pre-adhered assembly; and
   (d) placing the pre-adhered assembly under a vacuum for a period of time; wherein the time period comprises a time to remove the primer fugitive inhibitor by vacuum so as to permit the first and second pre-adhered surfaces to be adhered to one another.

2. The method of claim 1, wherein the primer comprises a platinum catalyzed silicone composition.

3. The method of claim 1, wherein the film adhesive comprises a silicone composition.

4. The method of claim 1, wherein the catalyst is selected from a group consisting of: peroxide and platinum.

5. The method of claim 4, wherein the catalyst includes a catalyst fugitive inhibitor.

6. The method of claim 1, wherein the primer is applied on the entire surface of the first structure surface and the entire surface of the second structure surface.

7. The method of claim 6, wherein the primer is applied at a thickness of less than or equal to approximately 100 microinches.

8. The method of claim 1, wherein the film adhesive is applied on the entire surface of either the first structure surface or the entire surface of the second structure surface.

9. The method of claim 8 wherein the film adhesive is applied at a thickness of less than or equal to approximately 0.02 inch.

10. The method of claim 5, wherein the time period further comprises a time to remove the catalyst fugitive inhibitor by vacuum so as to permit the first and second pre-adhered surfaces to be adhered to one another.

11. The method of claim 1, wherein the time period is less than or equal to approximately 8 hours.

12. The method of claim 1, wherein step (d) further comprises applying pressure to pre-adhered assembly.

13. The method of claim 12, wherein the pressure applied is less than or equal to approximately 250 pounds per square inch.

* * * * *